July 2, 1935.  L. R. CALVERT  2,006,567
TEMPERATURE CONTROL ATTACHMENT
Filed Dec. 3, 1931  4 Sheets-Sheet 1
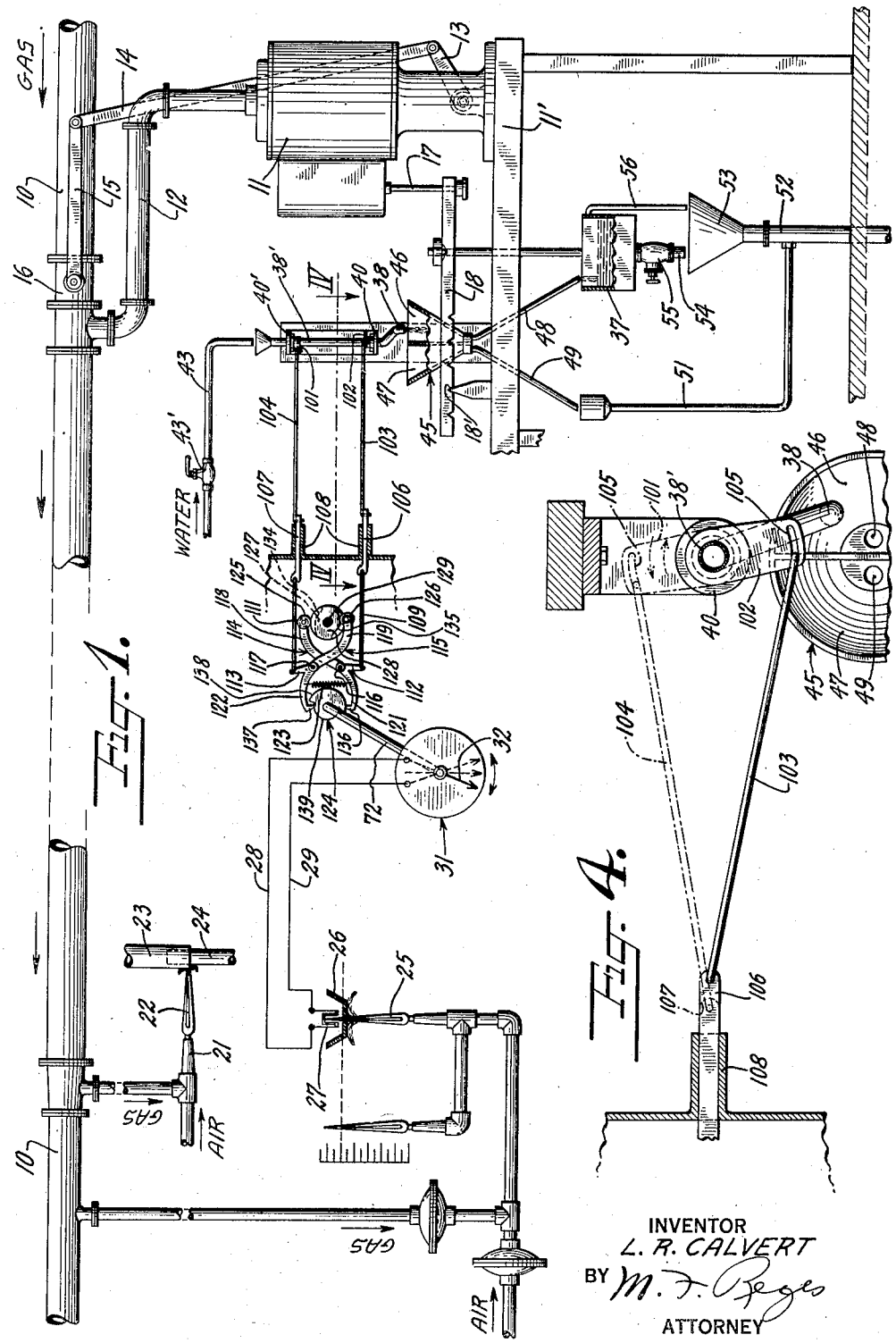
INVENTOR
*L. R. CALVERT*
BY *M. F. Reges*
ATTORNEY July 2, 1935.    L. R. CALVERT    2,006,567
TEMPERATURE CONTROL ATTACHMENT
Filed Dec. 3, 1931    4 Sheets-Sheet 2

INVENTOR
L. R. CALVERT
BY
ATTORNEY

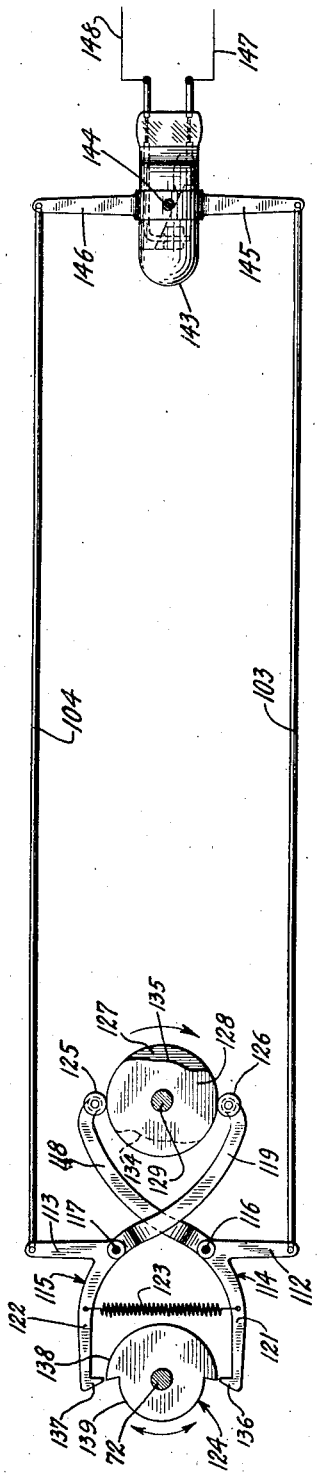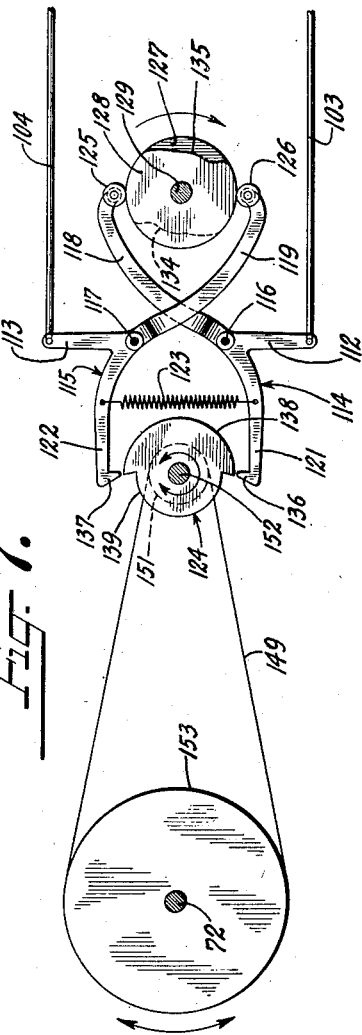

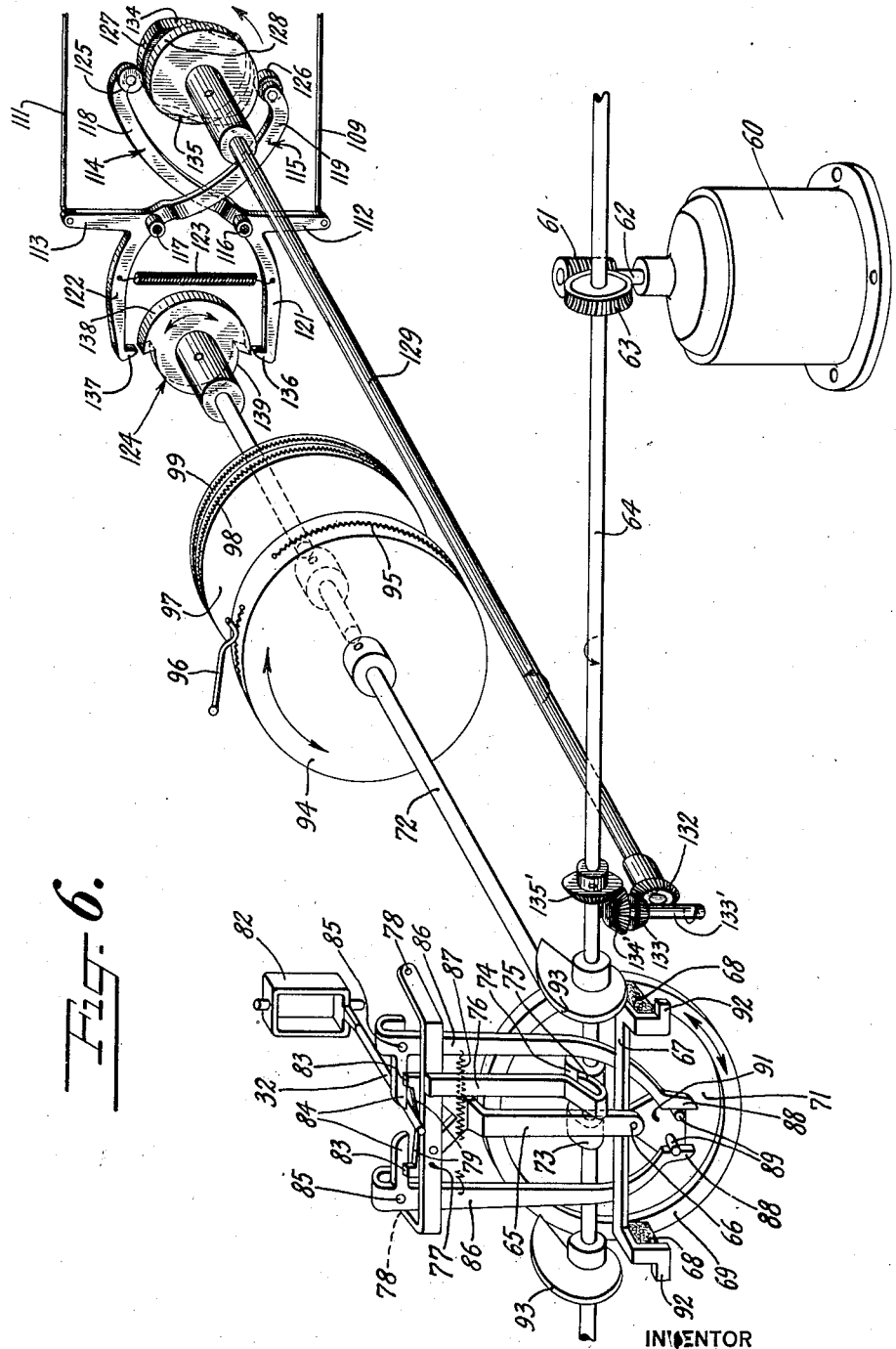

Patented July 2, 1935

2,006,567

UNITED STATES PATENT OFFICE 2,006,567

TEMPERATURE CONTROL ATTACHMENT

Landon R. Calvert, Newark, N. J., assignor to Westinghouse Lamp Company, a corporation of Pennsylvania Application December 3, 1931, Serial No. 578,717

11 Claims. (Cl. 236—70)

This invention relates to temperature control apparatus and relates more particularly to a coordination of machine elements to produce a positive action to control chemical, electrical or physical conditions and particularly variations in temperature.

Measuring and indicating apparatus have heretofore been employed for the recording of temperature variations but such apparatus as for example that shown in Reissue Patent 15,597 to H. Brewer utilize certain electrically operated and operating elements which meet certain requirements, but which in many cases do not give the necessary positive action. Furthermore, under certain conditions it is desirable to reduce or eliminate wiring, relays, contacts, etc., as for example, when operating an apparatus such as shown in my patent 1,762,156 June 10, 1930. This patent shows an apparatus in which variations of temperature affecting a thermo-couple are transmitted through a relay and other electrical means to change the direction of flow of a stream of water which in turn operates a fuel supply line.

It is an object of the present invention to simplify and render more positive the apparatus shown in my patent referred to above.

Another object is to transfer movement caused by electrical means into a positive mechanical movement.

A more specific object of the invention is to control a fluid flow in accordance with temperature change of a heat zone by mechanical means interposed between the medium to be controlled and electrical means affected by temperature variations.

Other objects and advantages of the invention will be more clearly understood from the following description together with the accompanying drawing in which Fig. 1 is a diagrammatic view showing the present invention employed to control the length and temperature of a gas flame.

Fig. 4 is a fragmentary detail view showing means for controlling a flow of liquid.

Fig. 5 is a diagrammatic representation of a mercury switch arranged to be actuated by the present mechanism.

Fig. 6 is a perspective view of the recording mechanism employed in connection with the mechanical control means and Fig. 7 is a fragmentary view of a modified form of the present mechanism in which the movement of a heat controlled member is amplified.

Figure 3:
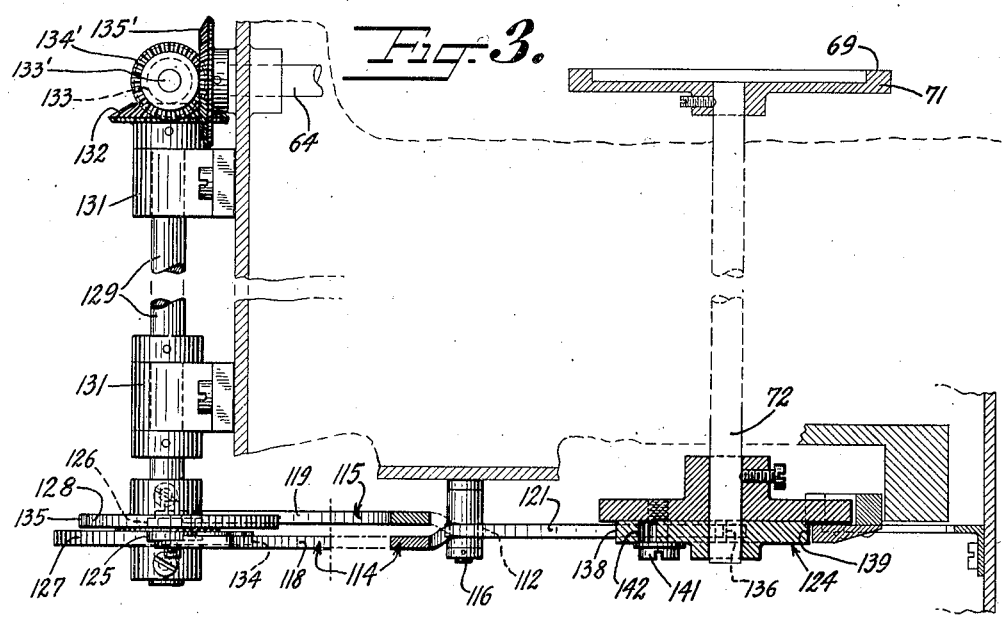
Fig. 3 is a view taken on lines III—III in Fig. 2.

The present invention may be used in connection with various devices as for example the operation of a mercury switch, or other cases where it is desirable to control a flow of electrical energy for various purposes. As a practical embodiment of the invention the same is shown in connection with an apparatus for maintaining a gas flame at a determined length and temperature, such apparatus being shown in my above mentioned patent. As set forth in this patent, in the manufacture of certain glass articles, where a plurality of blanks are to be consolidated by fusing, it is necessary to employ a gas flame to soften the parts for consolidation.

The gas flame, in order to obtain the best results, should be maintained at a selected length and temperature, and should be held uniform. When a large number of machines are used having many flames and when the machines are positioned over relatively great areas, it is difficult under ordinary conditions to maintain the above desired conditions. The flames vary in length and temperature by reason of the change in pressure in the main gas or fluid line. Variations in the density and composition of the fluid fuel also occur.

Regulating means are provided in the form of a control device. For example a Smoot regulator may be employed to regulate the pressure but the variations resulting from the change in density or chemical composition are not eliminated.

In the type of apparatus to which the present invention is applied, a standard or master flame is arranged to operate an electric thermo-couple. The thermo-couple is so disposed with respect to a master or standard flame that upon an increase in the temperature or flame length the variations in temperature are indicated on a recording instrument. Any suitable recording instrument may be used and the present invention provides mechanical elements arranged to be actuated by the recording instrument to translate positive motion to actuate means for controlling a fluid flow or to actuate a movable element or switch as for example a mercury switch to control the flow of electrical energy.

The present invention may be applied to an auxiliary or supplemental control for a plurality of gas flames distributed throughout a factory and receiving fuel from a common source. As shown in the drawings, a main 10 may receive gas supplied from a local gas producer or more frequently from the city gas supply line.

Before the gas is passed to the machines where it is to be used in the form of flames, it is common practice to regulate the gas pressure and as shown, a pressure regulator 11 is provided mounted on a supporting frame or table 11'. This regulator may be of any well-known type and is usually connected to the gas main by a conductor such as 12. Within the regulator is a suitably positioned diaphragm sensitive to the pressure within the main. The diaphragm operates to move a lever arm 13 which is connected to a link 14 pivoted to an arm 15 of a valve 16, which valve controls the inlet flow of gas. The diaphragm within the regulator may be set so that the valve 16 will be automatically opened and closed to maintain a given pressure of gas in that part of the main 10 which conducts fuel to the various machines or locations where it is to be used in the form of flames.

The pressure regulator 11 is usually supplied with a depending member 17 which under ordinary conditions is weighted and so associated with the diaphragm as to set the same to operate the valve 16 at a given pressure. In the present invention, the usual weights are omitted and the diaphragm is controlled by means of a lever member 18 in a manner to be hereinafter more fully described.

The structure comprising the pressure regulator, control valve, etc., just described is well-known and commonly employed in connection with gas burning systems.

As hereinbefore pointed out, however, the present invention aims to more accurately regulate the working length and temperature of the gas flames in a factory receiving fuel from the main 10. The commonly used elements of the system have been described first for a better understanding of the following detailed description of the present novel construction.

Gas entering the main 10 may be distributed throughout a factory to various machines such as glass-working machines each machine employing a plurality of nozzles, such, for example, as 21, the flame 22 of which may be directed to heat glass parts 23 and 24 to render the same plastic and fuse or unite them. When uniting delicate glass parts, as for example, in the construction of a composite glass body such as an electrical incandescent lamp, it is important that the flame be maintained at a uniform length and that the heat of the flame be maintained at a constant temperature. A fine flame of uniform length and temperature is also of great advantage in other industries as for example in singeing or in the production of artificial silk.

Ordinarily with a gas of a suitable density and composition, the pressure regulator should maintain the proper working conditions of the flame. Owing to the fact that the composition of the gas varies, means are employed to compensate for such variation, which means may comprise a master flame 25 which is directed against a baffle 26 to heat the same. This baffle is constructed in an effective and novel manner as set forth in my Patent No. 1,762,156 issued June 10, 1930, referred to hereinabove.

At the opposite side of the baffle, I provide a thermo-couple 27 of any suitable type in such position as to be responsive to the varying temperature of the master flame 26. The thermo-couple is connected by leads 28 and 29 to a meter measuring or indicating instrument 31 as for example a galvanometer so that a fluctuation in the temperature of the thermo-couple will cause an oscillation of the needle or pointer 32 of the meter.

In accordance with the present invention the movement of the needle 32 is utilized to control the operation of certain mechanical elements which in turn control or regulate the Smoot regulator as shown in the present embodiment of the invention or to control a flow of electrical energy by operating a switch or other mechanical current controlling device.

In the construction shown in my patent above mentioned, the needle 32 operated between contacts to cause a flow of electrical energy through a relay to cause means to regulate the flow of gas or fuel by varying the amount of a liquid in a bucket 37 which is substituted for the counterweights on the regulator 11. The bucket 37 is suspended from the lever arm 18 fulcrumed at 18'. By filling or emptying the bucket 37, a varying weight may be placed upon the arm 18 and consequently the depending member 17, resulting in an action corresponding to the manual removal and replacement of iron weights. Liquid such as water, is supplied to the bucket through a nozzle 38 at the lower end of a pipe 38'. The said pipe is supported in bearings 40 and 40' and its upper end is provided with a funnel to receive liquid preferably water from a supply pipe 43 having a valve 43'.

Means for guiding the water into the bucket may comprise a duplex funnel 45 having compartments 46 and 47. The compartment 46 is provided with an outlet 48 positioned to discharge water into the bucket 37 and the compartment 47 is provided with an outlet 49 to direct water to pipe 51 for passage to a waste pipe 52, said pipe having a funnel-shaped opening 53 to receive waste water from the bucket 37, said bucket being provided with an outlet nozzle 54 controlled by a valve 55.

An over-flow pipe 56 is also provided to direct any over-flow water from the bucket to waste pipe 52. The nozzle 38 is offset with respect to the pipe 38' so that a rotation of the pipe about its longitudinal axis will move the nozzle over either of the compartments 46 or 47. Means for this purpose will presently be described.

When the nozzle 38 is moved to position over compartment 46, the water flows into the bucket 37 and weight is supplied to the lever arm 18 and the pressure regulator operates to open the valve 16. An opposite movement of the nozzle 38 terminates the flow of water to the bucket, permitting the water to flow to waste and the bucket operates to hold the valve 16 open until the water has dripped from the bucket through the outlet 54.

The foregoing description sets forth equipment including the source of the fuel and regulating means, also the means for indicating the variations in the temperature of a heat zone caused by the ignited fuel.

This equipment is shown in my patent referred to above and the present invention is concerned with means for mechanically controlling the regulating means in accordance with variations in temperature of the heat zone.

In carrying out the present invention I may use any suitable recording instrument and have selected a part of a Leeds and Northrup measuring and indicating apparatus such as disclosed in Reissue Patent 15,597.

As shown more clearly in Fig. 6 of the drawings any suitable source of power may be employed as for example an electric motor 60 preferably operable at a constant speed and having a worm 61 on shaft 62. The worm 61 is in mesh with worm wheel 63 on a horizontal shaft 64. The shaft 64 is provided with means to be later described for utilizing a recording mechanism, which mechanism comprises a lever 65 pivoted near its upper end. At the rear of the lever member 65 and pivotally connected at 66 adjacent to the lower end thereof is a horizontal rocker member 67. The pivot point 66 is intermediate the ends of the rocker member 67 which ends are each provided with a shoe 68. The shoes are preferably of cork or other suitable friction material to engage a rim 69 of what may be termed a clutch-disc or wheel 71 secured to one end of a shaft 72.

Secured upon the shaft 64 is a cam 73 which periodically engages the lever member 65 to move it outwardly away from the disc 71, in opposition to a suitable spring, (not shown) thereby lifting the shoes 68, 68 free from the rim 69 of the clutch disc 71, the aforesaid spring returning the shoes 68, 68 into engagement with the rim 69 after predetermined rotation of the cam 73.

Upon the shaft 64 is secured a second cam 74 which, after the cam 73 has lifted the shoes 68, 68 from the rim 69, actuates a cam follower 75 on the lower end of an arm 76 secured at its upper end to a U-shaped member 77 arranged to rock about pivot points 78, 78 adjacent to the ends of its arms. Mounted on the U-shaped member 77 are what may be termed a pair of lower gripper jaws 79, 79. These jaws are arranged with oppositely inclined surfaces. Disposed immediately above the jaws 79 is a needle or pointer 32 of any suitable measuring or indicating instrument, as for example, the galvanometer 31 of which 82 represents the movable coil or element which swings or deflects the needle or pointer 81 to the right or left.

At opposite ends of the jaws 79, 79 are abutments 83, 83 for limiting the degree of movement or swing of the needle 32. Directly above the needle 32 and disposed over the path of movement of the needle, are what may be termed upper jaws 84, 84 so arranged that when the needle moves from its central position to either side, an actuation or relative movement of the jaws will engage them with the needle.

Between the ends of the respective pairs of jaws a gap of sufficient width is provided to allow the needle to raise when it is in balanced, zero or mid position. The jaws 84, 84 are pivoted at 85, 85. The needle 32 normally swings freely between the lower edges of the jaws 84 and the upper edges of the jaws 79. Each of the jaws 84 is provided with a depending arm 86. These arms are normally urged toward each other by a spring 87. The arms 86 terminate in contact fingers 88, 88 disposed for engagement with pins 89, 89 extending from a triangular plate 91 attached to the lower end of the lever 65. Opposite ends of the arm 67 are provided with ears or lugs 92, 92 adapted to be engaged by cams 93, 93 similar in shape and similarly positioned and secured upon the shaft 64. The shaft 72 is provided with a disc or wheel 94 of insulating material carrying on its periphery a resistance conductor 95 which may be disposed in the form of a helix laid in a groove on the periphery of the disc 94. Engaging resistance 95 is a stationary contact member 96. This contact member serves in the operation of the recording mechanism described, to restore a balance of electro-motive forces which tend to decrease the deflection of the needle 32.

This operation is clearly described in the above mentioned Reissue Patent 15,597 and it is believed that in the present description it is only necessary to generally indicate certain of the parts mounted on the shaft 72, such as the wheel or disc 97 carrying on its periphery resistances 98 and 99 of a Wheatstone bridge constituting a part of the recording construction.

The mechanism just described provides an apparatus wherein the variations in the flow of electrical energy, by reason of differences in temperature cause the pointer 32 to oscillate. The movement of the pointer to either side results in its engagement between a pair of jaws 84 and 79. When so engaged a rotation of the cam 74 causes a depending arm 86 to rock and engage a pin 89 thus tipping the lever member 67 about its pivot point 66.

Inasmuch as the lever is normally urged to bring the shoes 68, 68 against the disc 71 an adjustment of the lever or a change in its position about its fulcrum will leave it, when the shoes are engaged, with the disc ready to be moved accordingly about its axis and inasmuch as the disc is secured to shaft 72 the relative position of the contact member 96 is changed and more or less resistance is cut in to the Wheatstone bridge.

For the purpose of causing a return movement of the disc 71 the cams 93, 93 are provided so that if the arm 67 is tipped and the shoes frictionally engage the disc, a cam 93 will engage a lug 92 and move the shoe and consequently the disc 71 with the result just described. This mechanism therefore provides a shaft 72 which is rotated in opposite directions in accordance with the oscillation of the needle 32.

Whereas it has been proposed to employ the movement of the shaft such as shaft 72 to operate contact members for controlling a flow of energy to perform certain operations, the present invention utilizes the movement of the said shaft 72 to mechanically translate motion to means for controlling other mechanism. As hereinbefore mentioned the present embodiment of the invention includes apparatus for controlling the flow of a liquid to provide potential energy for actuating a regulator.

The liquid control mechanism comprises the pipe 38' rotatable about its longitudinal axis in bearings 40 and 40'. The said pipe 38' is provided with arms 101 and 102 connected to ends of links 103 and 104 respectively, which ends are disposed in slots 105, 105 in the arms. The opposite ends of the links 103, 104 are connected with the ends of slide rods 106 and 107 respectively, movable in guide bearings 108, the other ends of the slide rods are connected by means of links 109 and 111 with arms 112 and 113 extending from lever-members 114 and 115 respectively.

The member 114 is pivoted at 116 and member 115 is pivoted at 117. The members 114, 115 are arranged so that their arms 118, 119 respectively are movable in opposite directions to cause a reverse movement of their opposite arms 121 and 122, which latter arms constitute fingers normally held by a spring 123 against the surface of a cam 124. The ends of the arms 118, 119 are provided with rollers or cam followers 125 and 126 respectively. The roller 125 is movable over the surface of a cam 127 and the roller 126 is movable over a surface 128, the said cams being adjustably mounted on a countershaft 129.

The shaft 129 may be supported in suitable bearings 131 and may be provided with a bevel gear 132 in mesh with a bevel gear 133 at one end of a stub shaft 133'. The stub shaft 133' may be provided with a bevel gear 134' in mesh with a bevel gear 135' on the shaft 64. The countershaft 129 is thus driven by the constantly driven shaft 64 and the gears may be so proportioned that a rotation of the counter shaft is at a given number of revolutions per minute. In the present construction it is preferable to rotate the cams 127, 128 at about one revolution per second.

The cams 127, 128 are provided with drop portions 134 and 135 respectively so that the cam followers which are held in contact with the cam surfaces by spring 123 will be free to move toward or away from each other depending upon the variations in the surfaces of their respective cams.

Figure 2:
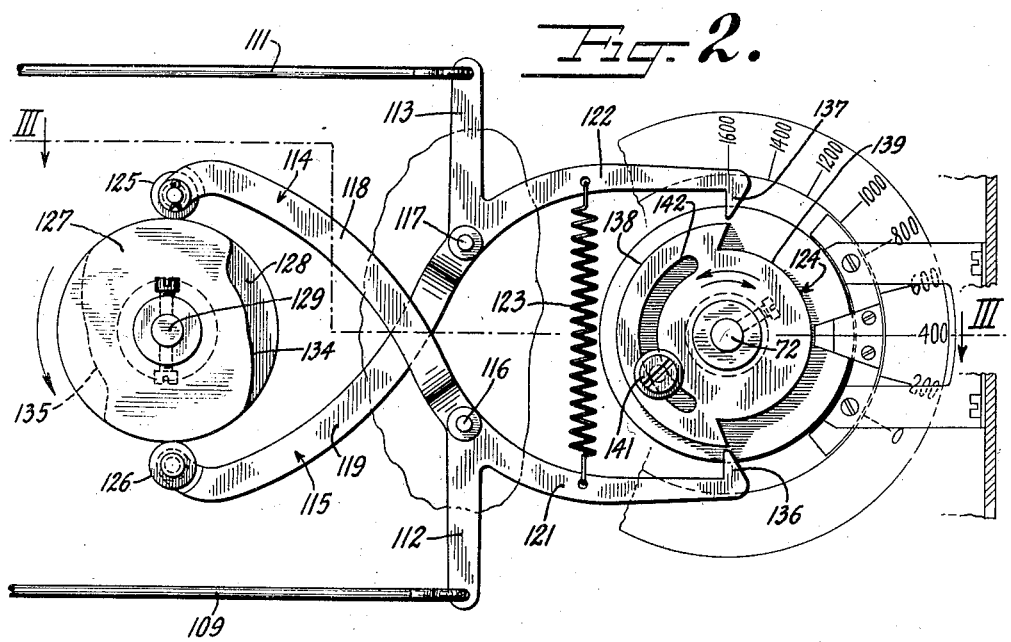
Fig. 2 is an enlarged detail view of a portion of the mechanical construction for controlling the operation of a gas regulator.

As shown more clearly in Fig. 2 the arms 121, 122 are provided with projections or fingers 136 and 137 respectively which are normally held by the spring 123 adjacent to surface 138 of the cam 124, the positions of the fingers are however, determined by the positions of the cam followers 125, 126 as they travel over the cams 127 and 128. When the said followers traverse the drop portions 134 and 135 of the cams 127, 128 the fingers 136 and 137 will engage the surface 138 of cam 124. When the cams 127, 128 move to position the cam followers 125, 126 on the drop portions of these cams one of the fingers will obviously be free to move to actuate the links 109 and 111, if the cam 124 has moved to position the drop portion 139 thereof beneath a finger. The cam 124 may be set by means of an adjustment screw 141 and slot 142 so that the fingers are held separated by the cam surface 138 and at the edge thereof irrespective of the movement of the cams 127, 128, but one of the fingers will drop upon a slight rotary movement of the cam 124.

Considering the operation of the lever member 115, for example, it will be noted that the cam 128 will hold the finger 137 in position during a partial rotation of the cam 128 but when the cam follower 126 rides over the drop portion 135 of the cam, the finger 137 will be free to move toward the cam 124. If at this time the cam 124 has been rotated so as to position the drop portion 139 of the cam 124 beneath the finger 137 the lever 115 will then move to actuate the arm 113 exerting a pull on the links 111, 107 and 104 and consequently move the end 38 of the liquid feed pipe to position to discharge more liquid into the bucket 37. If the cam 124 remains in position to allow the finger 137 to move toward the center of the cam then a rotation of the cam 128 causes the roller 126 to travel over the surface 135 to permit a movement of the finger 137 toward the center of the cam 124. This movement of the finger towards the link 104 acts to pull the arm 101 thus rocking the outlet 38 over the compartment 46.

The outlet or nozzle 38 remains in this position to feed liquid to the weight chamber 37 and the lever member 115 is free to rock by reason of the slot 105 in the arm 101. When the disc 124 moves in an opposite direction the finger 137 periodically lifted by the cam 128 again contacts with the surface 138 of the cam 124 while the finger 136 drops inwardly toward the center of the cam causing the lever member 114 to pull the arm 102 and thus move the nozzle 38 to position over compartment 47 to let the liquid run to waste.

When in this position the finger 136 may be moved up and down by reason of the rotation of the cam 127, the end of the link 103 being movable in the slot 105 in the arm 102. The liquid then continues to run to waste until the cam 124 is moved in an opposite direction and the foregoing operations are repeated. Thus it will be seen that a movement of the cam 124 serves to mechanically control the discharge of liquid either to the compartment 46 and thus serving to add to the weight 37 or to compartment 47 from which the liquid runs to waste.

The recording mechanism shown in Fig. 6 serves to convert variations in temperature into mechanical movement through the agency of shaft 72 and this movement is utilized by the present invention to operate means for controlling other mechanism, as for example a gas regulator or for operating a mercury switch, as shown in Fig. 5. In this figure a mercury switch 143 is shown pivoted at 144. The switch may have a pair of arms 145 and 146 connected to links 103 and 104 so that the switch will be tilted to make and break internal electrodes connected with conductors 147 and 148. Any suitable type of mercury switch may be used and as the internal constructions thereof are well known the same is not described herein. With the mechanism including the switch 143 it is possible to regulate a flow of electrical energy as for example if an electrical furnace is used thus actuating the switch in accordance with temperature variation of the furnace the temperature may be held constant within a given range.

From the foregoing description it will be evident that an extremely fine degree of regulation may be had when utilizing the present apparatus and as shown in Fig. 2 the cam 124 may be so adjusted that a given movement thereof will be required before the fingers operate. For example, the cam may be adjusted for a given temperature so that one finger operates continually to hold the nozzle in a given position, as for example, to feed liquid to waste, thus allowing the temperature of the gas flame or other heat zone to continually rise until it reaches a certain degree, thus permitting the cam to be moved until the surface 138 of the disc becomes engaged by the finger 136. If a variation in temperature again occurs the finger 137 drops causing the nozzle 38 to be moved to discharge liquid to supply weight to the container 37. When this temperature is reached it will be held constant since the mechanism will then operate to adjust the nozzle in accordance with any variation in temperature as above described.

If desirable the movement of the shaft 72 may be amplified and for this purpose a belt 149, as shown in Fig. 7, may be employed leading from a pulley 151 on a counter shaft 152 and around a pulley 153 on the shaft 72. With this construction the movement of the shaft when translated to the cam 124 is multiplied allowing for more convenient and accurate adjustment.

By reason of the above mechanism, it is possible to get a more complete degree of sensitivity in the temperature regulation of the heat zone to be controlled. For example, the cam 138 may be moved sufficiently to drop one of the fingers 136, 137 upon a minute movement of the pulley 153 which pulley is actuated by the member 71; the member 71 being actuated in accordance with the variation in the temperature of the heat zone under control. By reason of the amplified or relatively great movement of the member 138, it is, therefore, possible to secure a degree of sensitivity or fineness of regulation in temperature control heretofore unattainable in devices of the present character.

Operation

When the present invention is employed to control the temperature and length of a gas flame, in accordance with the practical embodiment of the invention shown, a fluid such as illuminating gas may be supplied through the conductor 10 to various parts of a building, and connected by suitable conduits with burners such as 21 to produce flames 22 for glass work parts. For the purpose of controlling the temperature of the gas flames, a standard flame 25 is employed. This flame is directed against a baffle 26 and a heat zone is produced. An electron thermo couple 27 is disposed in and is responsive to variations in the temperature of the heat zone.

The variations in temperature so affect the thermo couple that the needle 32 of the indicating instrument 31 to which the thermo couple is connected is caused to oscillate in accordance with the variations in the electromotive force in the thermo couple circuit. A movement of the needle or pointer 32 indicates a variation in the temperature or length of the flame 25 and by reason of the cooperating mechanism including the jaws 79—79 and 84—84 as shown in Figure 6, the pointer serves to operate mechanism which rotates a disc 71 and consequently the shaft 72 in either a clockwise or counter clockwise direction.

The end of the shaft 72 opposite to that secured to the disc 71, is provided with a movable element in the form of a cam 124 which is so arranged as to have its larger or raised portion normally positioned to engage the ends or fingers 121 and 122 of the lever or rod or arms 112 and 113. These fingers are urged toward the cam by the spring 123 but the opposite ends of the arms engage the continuously rotating cams 127 and 128 on the shaft 129 so that the fingers may drop against the cam 124 periodically as the cams 127 and 128 rotate.

When the cam 124 moves by reason of the oscillation of the pointer 32, then one of the fingers will drop as a cam 127 or 128 moves to permit its contacting cam follower to travel over the reduced portion of the cam it is following. This movement causes a pull on one of the links 104 or 103 causing the nozzle 38 to either supply water to the counter-balancing bucket 37 to regulate flow of gas through the pipe 10, or to discharge water to waste permitting the flow of gas through the pipe 10 without further regulation.

It will be evident that the movement produced by reason of the action of the fingers 136 and 137 may be employed for various purposes. The present invention is particularly adapted for controlling the supply of heat in accordance with variations in the temperature of a heat zone produced by an electric heater, since the instrumentalities disclosed, by reason of the present invention, serve to convert temperature variations into mechanical movements which are utilized to regulate the source of heat supply and thus maintain a heat zone at a predetermined temperature.

Altho a preferred embodiment of the invention is shown and described herein, it should be understood that various modifications may be made therein without departing from the scope and spirit of the invention as set forth in the annexed claims.

What is claimed is:

1. A device for regulating the temperature of a heat zone, a cam-member, means for rotating said cam clockwise or counter-clockwise in accordance with temperature variations in said zone, a pair of lever members having ends engageable with said cam, a second cam member, means for rotating said second cam, means for holding the other ends of said lever members engaged with said second cam, an arm extending substantially transversely from each of said levers, a movable element for controlling the temperature of said heat zone and means connecting said element with said means.

2. In an apparatus having a member movable in accordance with variations in the temperature of a heat zone the combination with a continuously driven member, a pivoted member having one end engageable with said continuously movable member, and the other end engageable with said first mentioned member, means operable upon a movement of said first mentioned member to rock said pivoted member, another movable member and means connecting said last named member with said pivoted member.

3. In an apparatus having a shaft movable upon variations in the temperature of a heat zone, a movable element, a pair of oppositely movable pivoted members for translating motion from said shaft to said element, means for intermittently moving said members and means on said shaft for controlling the degree of movement of said members.

4. In an apparatus having a shaft movable upon variations in the temperature of a heat zone, a movable element, a movable member intermediate said shaft and said element for translating motion from said shaft to said element, means on said shaft controlling the movement of said member, and means for intermittently moving said member into operative relation with said first mentioned means.

5. In an apparatus of the class described, a disk having a high and a low surface, means for moving the disk clockwise or counter clockwise in accordance with variations in the temperature of a heat zone, a rocker arm, means for moving said arm into and out of operative relation with said disk to engage a high or low surface thereof whereby the degree of movement of said arm is varied, an electrical circuit and means operating under the action of said arm to open or close said circuit.

6. In an apparatus of the class described, an oscillatory member, a member having contact surfaces in different planes movable in accordance with temperature variations in a heat zone, means for oscillating said member to cause it to move into and out of contact relation with the surfaces of said member, a movable element, and means for translating movement from said oscillatory member to said element.

7. In an apparatus of the class described, a shaft movable in accordance with the variations in the temperature of a heat zone, a member for controlling the temperature of said zone, a rocker arm, means for actuating said member when said arm moves a predetermined distance, a continuously driven member for moving said arm and means on said shaft for limiting the degree of movement of said arm.

8. In an apparatus of the class described, a shaft movable in accordance with the variations in the temperature of a heat zone, a member for controlling the temperature of said zone, a rocker arm, means for actuating said member when said arm moves a predetermined distance, a continuously driven member for moving said arm, means on said shaft for limiting the degree of movement of said arm, and means for adjusting said last mentioned means to varying the degree of movement of said arm to vary the relative movement of the member for controlling the temperature of said zone.

9. In an apparatus of the class described, means movable in accordance with variations in the temperature of a heat zone, a cam plate having portions of its cam surface of different diametrical dimensions movable with said means, a pivoted member having one end in contact with the greater dimensioned cam surface, a continuously driven member for urging said end against said cam, a movable member for varying the temperature of said heat zone, means connecting said member with said pivoted member to cause an actuation of said movable member upon a movement of said pivoted member when said cam moves to remove the greater dimensioned portion of said cam from contact with the end of said pivoted member.

10. In an apparatus of the class described, means movable in accordance with the temperature of a heat zone, a cam plate having portions of its cam surface of different diametrical dimensions movable with said means, a pivoted member having one end in contact with the greater dimensioned cam surface, a continuously driven member for urging said end against said cam, a movable member for varying the temperature of said heat zone, means connecting said member with said pivoted member to cause an actuation of said movable member upon a movement of said pivoted member when said cam moves to remove the greater dimensioned portion of said cam from contact with the end of said pivoted member, and means for adjusting said cam to vary the degree of movement necessary to cause the end of said pivoted member to drop to said lesser dimensioned portion of said cam.

11. In an apparatus for controlling the temperature of a heat zone, an arm having one end movable through a given path, a movable member, a member having contact surfaces in different planes and rotatable in accordance with variations in the temperature of said heat zone, said surfaces being movable across the path of movement of the end of said arm, means for intermittently moving said arm through said path to and from engagement with said surfaces, a movable element and means for translating motion from said arm to said element.

LANDON R. CALVERT.